(No Model.)
J. A. SCROGGS.
CULTIVATOR AND SCRAPER COMBINED.
No. 377,781. Patented Feb. 14, 1888.
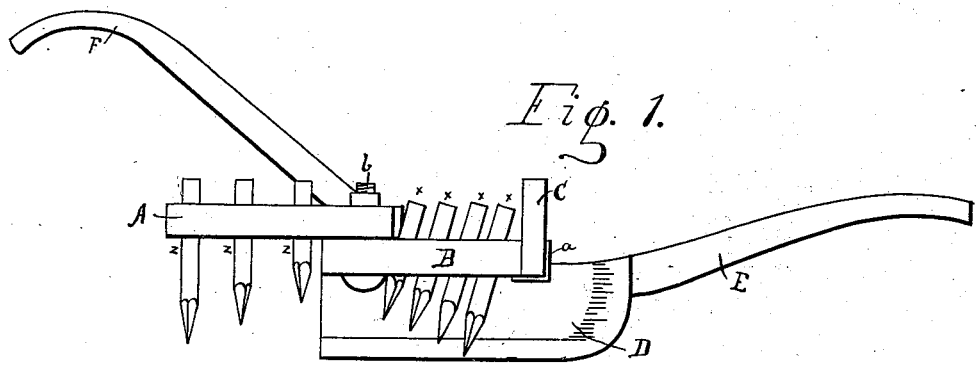
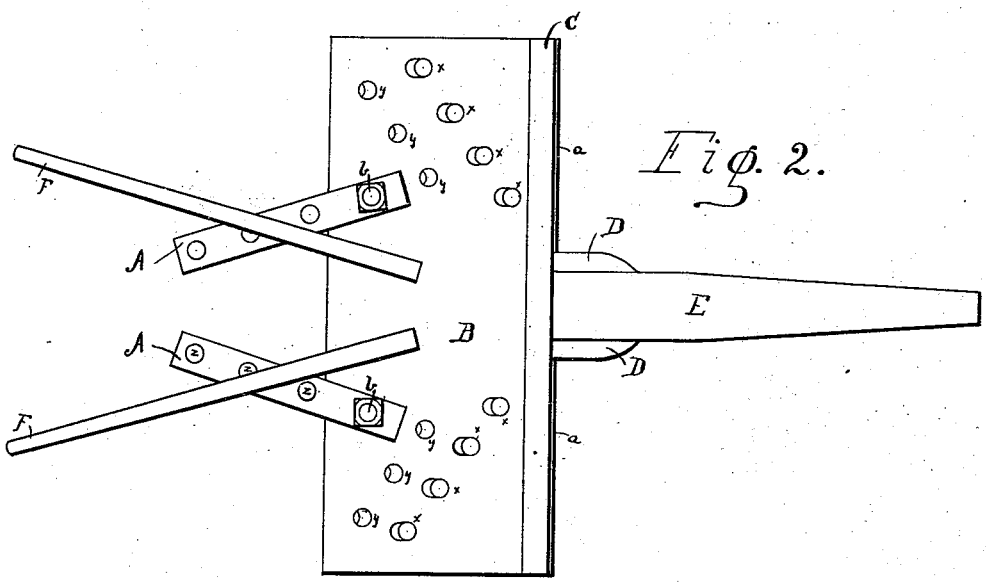
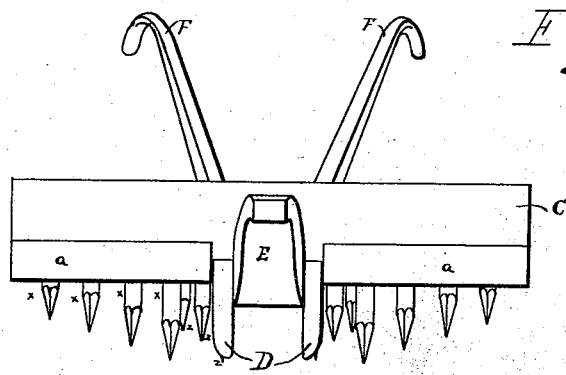
Witnesses
Inventor
By his Attorney

United States Patent Office.

JAMES A. SCROGGS, OF NEAR RANDOLPH, ASSIGNOR OF ONE-HALF TO GEORGE W. STEVENSON, OF SHERMAN TOWNSHIP, KANSAS.

CULTIVATOR AND SCRAPER COMBINED.

SPECIFICATION forming part of Letters Patent No. 377,781, dated February 14, 1888.

Application filed September 6, 1887. Serial No. 248,985. (No model.)

*To all whom it may concern:*

Be it known that I, JAMES A. SCROGGS, a citizen of the United States, residing in Sherman township, near Randolph, in the county of Riley and State of Kansas, have invented certain new and useful Improvements in a Harrow-Tooth Cultivator and Scraper Combined; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in cultivators having harrow-teeth in place of shovels, and so constructed as to combine a scraper therewith; and the objects of my improvements are to provide a simple, cheap, durable, and easily-constructed cultivator and scraper combined, more particularly for cultivating young listed corn the first time or two and exterminating the weeds without injuring the young and tender plants, at the same time reducing the ridges and preparing the ground for the ordinary sulky or shovel cultivator. I attain these objects by the combination of parts illustrated in the accompanying drawings, in which—

Figure 1 is a side elevation of my invention, Fig. 2 a plan of same, and Fig. 3 a front elevation thereof.

Similar letters refer to similar parts throughout the several views.

The bed B, tongue E, handles F F, runners D D, front board, C, and adjustable wings A A (all of which may be made of any suitable material, hard wood being preferred) constitute the frame-work of my invention.

The bed B is provided with series of perforations $x\ x\ y\ y$, said perforations being inclined from the center rearwardly, and in said series of perforations the harrow-teeth are arranged, they being placed to incline rearwardly from a vertical line, and are graduated so that they will decrease in length from the center of the bed outwardly, as shown. I have shown only one row of harrow-teeth on each side; but, if thought desirable, more may be inserted, as through the holes $y\ y\ y$.

For the sake of simplicity, I secure the tongue E, between the runners D, to the under side of the bed; but it may be secured to the cultivator in any manner desired. Said runners serve as a fender for the corn.

To the rear of the bed B is affixed the wings A A by means of the bolts $b\ b$, by loosening the nuts on which said wings may be adjusted to any desired angle. Said wings are provided with graduated harrow-teeth $z\ z\ z$, that increase in length from the front of the wings rearwardly, so that when said wings are adjusted converging toward each other, as shown in Fig. 2, the longer teeth will be near the center of the cultivator. The teeth on the wings A are shorter than the teeth on the bed B. By graduating the teeth on the bed of the cultivator, as described, they sink to a uniform depth into the soil, which is essential to more thoroughly pulverize the sides of the ridges, and the teeth on the wings A A are made shorter, as they are not intended to pulverize the soil, but to recover the same and draw it to the plants without covering the plants or injuring them in any way.

The front board, C, having re-enforcing-plates $a\ a$, of metal or other suitable material, serves as a scraper to reduce the ridges between the rows.

Having thus described my invention, what I claim as new, and desire to secure by Letters Patent, is—

In a cultivator, the combination, with a bed having graduated harrow-teeth projecting through it and runners secured to the under side thereof, of a front board secured to the forward edge of the bed adapted to reduce the ridges between the rows, and the adjustable wings pivoted to the bed and provided with graduated harrow-teeth shorter than the harrow-teeth on the bed, substantially as shown and described.

In testimony whereof I affix my signature in presence of two witnesses.

JAMES A. SCROGGS.

Witnesses:
S. P. JOHNSON,
O. P. A. LINDAHL.